(12) United States Patent
Kim et al.

(10) Patent No.: US 8,486,163 B2
(45) Date of Patent: Jul. 16, 2013

(54) MICRO REFORMING REACTOR FOR FUEL CELL AND METHOD OF PREPARING THE SAME

(75) Inventors: Ju-Yong Kim, Suwon-si (KR); Ho-Jin Kweon, Suwon-si (KR); Jae-Jeong Kim, Seoul (KR); Oh-Joong Kwon, Chunan-si (KR); Sun-Mi Hwang, Seoul (KR)

(73) Assignees: Samsung SDI Co., Ltd., Yonging-si (KR); Seoul National University Industry Foundation, Seoul (KR)

( * ) Notice: Subject to any disclaimer, the term of this patent is extended or adjusted under 35 U.S.C. 154(b) by 2034 days.

(21) Appl. No.: 11/584,993

(22) Filed: Oct. 19, 2006

(65) Prior Publication Data

US 2007/0087935 A1 Apr. 19, 2007

(30) Foreign Application Priority Data

Oct. 19, 2005 (KR) ........................ 10-2005-0098689

(51) Int. Cl.
*B01J 7/00* (2006.01)
*B01J 8/00* (2006.01)

(52) U.S. Cl.
USPC ..... 48/61; 48/127.9; 48/75; 48/76; 48/197 R; 48/198.1; 48/198.7; 422/502; 422/503; 422/602; 422/603; 422/625; 422/628; 422/629

(58) Field of Classification Search
USPC .................................. 422/211, 240, 171, 177
See application file for complete search history.

(56) References Cited

U.S. PATENT DOCUMENTS

| 3,485,658 | A  | * | 12/1969 | Iler ............................... 428/328 |
| 7,744,830 | B2 | * | 6/2010  | Morse et al. .................. 422/211 |
| 2004/0087439 | A1 | * | 5/2004 | Hwang et al. ................ 502/302 |
| 2004/0123626 | A1 | * | 7/2004 | Caze et al. ..................... 65/17.2 |
| 2005/0170142 | A1 | * | 8/2005 | Remy ........................... 428/141 |
| 2006/0194697 | A1 | * | 8/2006 | Raybould ................ 502/527.12 |

FOREIGN PATENT DOCUMENTS

| JP | 2003-301295 | 10/2003 |
| JP | 2005-103399 | 4/2005 |
| JP | 2005-169213 | 6/2005 |
| KR | 10-2004-008221 | 1/2004 |
| WO | WO 03/083984 A2 | 10/2003 |

OTHER PUBLICATIONS

Patent abstracts of Japan for publication No. 2003-301295 dated Oct. 24, 2003 in the name of Naotada Ogura.
Patent abstracts of Japan for publication No. 2005-103399 dated Apr. 21, 2005 in the name of Tadao Yamamoto.
Patent abstracts of Japan for publication No. 2005-169213 dated Jun. 30, 2005 in the name of Kazuhiro Mae et al.

* cited by examiner

*Primary Examiner* — Kaity V. Handal
(74) *Attorney, Agent, or Firm* — Christie, Parker & Hale, LLP

(57) ABSTRACT

A micro reforming reactor includes a first substrate with a micro channel having a width of less than 1,000 μm bonded to a second substrate to form a micro tunnel. An adhesive layer is formed on the internal walls of the micro tunnel using a flow coating method. A catalyst may then be optionally formed on the adhesive coated internal walls of the micro tunnel, also using a flow coating method.

12 Claims, 8 Drawing Sheets

MICRO REFORMING REACTOR FOR FUEL CELL AND METHOD OF PREPARING THE SAME

CROSS-REFERENCE TO RELATED APPLICATION

This application claims priority to and the benefit of Korean Patent Application No. 10-2005-0098689 filed in the Korean Intellectual Property Office on Oct. 19, 2005, the entire content of which is incorporated herein by reference.

BACKGROUND OF THE INVENTION

1. Field of the Invention

The present invention relates to a micro reforming reactor and a method of manufacturing the same. More particularly, the present invention relates to a micro reforming reactor for a fuel cell including a micro tunnel with a catalyst layer on the micro tunnel, and a method of manufacturing the same.

2. Description of the Related Art

A fuel cell is a power generation system for producing electrical energy through an electrochemical redox reaction of an oxidant and a fuel such as hydrogen, or a hydrocarbon-based material, such as methanol, ethanol, natural gas, or the like.

A fuel cell is a clean energy source that can replace fossil fuel energy sources. It includes a stack comprising a plurality of unit cells and produces various ranges of power output. Since a fuel cell has four to ten times higher energy density than a small lithium battery, it may be used as a small portable power source.

Exemplary fuel cells include polymer electrolyte membrane fuel cells (PEMFCs) and direct oxidation fuel cells (DOFCs).

A PEMFC has power characteristics that are superior to those of conventional fuel cells, as it has a lower operating temperature and faster start and response characteristics. PEMFCs can be applied to a wide range of applications such as for portable electrical power sources for automobiles, distributed power sources for houses and public buildings, and small electrical power sources for electronic devices.

A typical PEMFC system includes a plurality of unit cells arranged in a stack, a fuel tank for storing a fuel, a fuel pump for pumping fuel from the fuel tank to a reformer, and a reformer for reforming the fuel to produce hydrogen gas to be supplied to the stack. The stack generates electrical energy through an electrochemical reaction of the hydrogen gases and oxygen.

In such a fuel cell system, the stack that generates electricity typically includes a plurality of unit cells stacked adjacent to one another, where each unit cell includes a membrane-electrode assembly (MEA) and a separator (also referred to as a bipolar plate). The membrane-electrode assembly includes an anode (also referred to as a "fuel electrode" or an "oxidation electrode") and a cathode (also referred to as an "air electrode" or a "reduction electrode") separated from one another by a polymer electrolyte membrane. The separators work as passageways for supplying the fuel and the oxidant to the fuel cell, and also work as conductors for serially connecting the anode and the cathode in the membrane-electrode assembly.

Using the separators, hydrogen gas is supplied to the anode and oxygen is supplied to the cathode. An electrochemical oxidation reaction of the fuel occurs at the anode, and an electrochemical reduction reaction of oxygen occurs at the cathode. Due to movement of the electrons generated by the reactions, electricity, heat, and water are produced.

SUMMARY OF THE INVENTION

One embodiment of the present invention provides a micro reforming reactor for a fuel cell that includes a micro tunnel formed by contacting a first substrate having a micro channel with a second substrate. Optionally, the catalyst layer is provided on the internal walls of the micro tunnel.

According to an embodiment of the present invention, a micro reforming reactor for a fuel cell, includes: a first substrate with a micro channel having a width of less than 1,000 μm; a second substrate that tightly contacts the first substrate to close the micro channel and form a micro tunnel through which fluid may flow; an adhesive layer formed on the internal walls of the micro tunnel; and a catalyst layer optionally formed on the adhesive layer on the internal walls of the micro tunnel.

According to another embodiment of the present invention, a method of preparing a micro reforming reactor for a fuel cell includes: providing a first substrate with a micro channel having a width of less than 1,000 μm, contacting a second substrate to the first substrate to close the micro channel and form a micro tunnel; forming an adhesive layer on the internal walls of the micro tunnel; injecting a catalyst coating liquid through the micro tunnel; injecting a gas into the micro tunnel; and heat treating the construction to form a micro reforming reactor.

DETAILED DESCRIPTION

Exemplary embodiments of the present invention will be described in detail with reference to the accompanying drawings.

The reformer reforms hydrogen-containing fuels through a reaction with water to produce hydrogen gas required for electricity generation in the stack, and also removes harmful materials such as carbon monoxide to increase the lifespan of the fuel cell.

Reformers with narrow flow channels have been developed for use with fuel cells for mobile or portable devices. Such reformers may have flow channels with widths and depths ranging from tens of micrometers to tens of millimeters.

A micro reforming reactor with a very narrow flow channel can provide fast mass transfer and heat transfer, requires small amount of reactants, and tends to be stable since the reaction is performed only inside the micro reforming reactor.

Typical methods of forming a catalyst layer on a micro reforming reactor include physical vapor deposition, chemical vapor deposition, anodic oxidation, catalyst packing, and dip coating based on sol-gel methods.

However, such methods tend to result in catalyst coating on unintended areas, for example, catalyst may be coated between substrates of the reforming reactor, causing unstable assembling of substrates and leakage of reactants during the reforming reaction.

Figure 1:
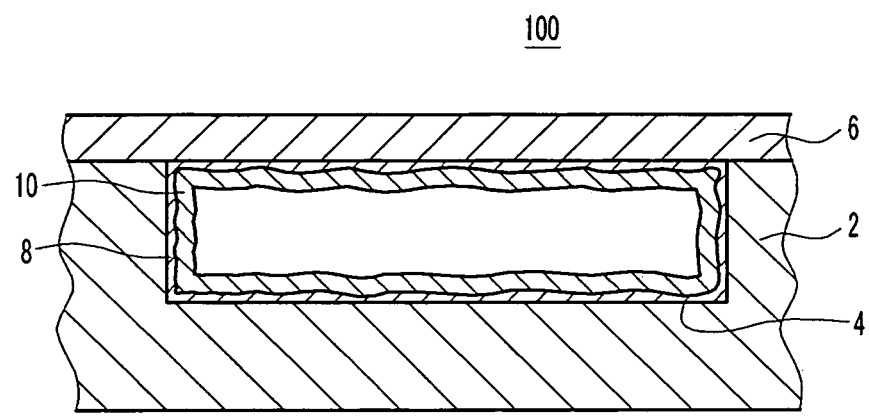
FIG. 1 is a schematic cross sectional view of a micro reforming reactor according to an embodiment of the invention.

As shown in FIG. 1, a micro reforming reactor 100 for a fuel cell system according to an embodiment of the invention includes a micro tunnel through which a fluid may flow. The micro tunnel is formed by providing a first substrate 2 which includes a micro channel 4. A second substrate 6 directly contacts the first substrate 2 to form the micro tunnel. The micro tunnel includes an adhesive layer 8 which adheres a catalyst layer 10 to the internal walls of the micro tunnel.

In an embodiment, the micro channel has a width 1,000 µm or less, and may range from 1 µm to 1,000 µm. In another embodiment, the micro channel has a width from 1 µm to 800 µm.

When the width of the micro channel is smaller than 1 µm, the channel becomes too narrow in that it is difficult to form a catalyst layer while permitting liquid or gas to flow through the micro tunnel. When the width of the micro channel is larger than 1,000 µm, the reforming reactor is not as useful for a down-sized fuel cell system.

According to an embodiment, the micro channel of the first substrate may have a depth ranging from 1 µm to 1,000 µm and, in another embodiment, from 1 µm to 800 µm. When the depth of the micro channel is smaller than 1 µm, the micro channel becomes too narrow to form a catalyst layer while still allowing liquid or gas flow. When the depth exceeds 1,000 µm, the reforming reactor is not as useful for a down-sized fuel cell system.

The first substrate and the second substrate may be of the same material or different materials. Exemplary materials for the first and second substrates include silicon wafer, borosilicate glass, stainless steel, aluminum, glass, polymers, and combinations thereof. However, the materials for the first and second substrates are not limited to the above-mentioned examples, and other materials such as metals, silicon, and ceramic may be used for the first and second substrates.

The micro channel of the first substrate may have a hydrophilic oxide layer on its surface that is naturally formed from the material from which the first substrate is made. The inclusion of an oxide layer can improve adhesion of both the adhesive layer and the catalyst layer to the substrate.

In an embodiment, the catalyst layer of the reforming reactor may have a thickness ranging from 1 µm to 30 µm. In another embodiment, the catalyst layer is from 1 µm to 25 µm thick. When the catalyst layer is thinner than 1 µm, the reforming reaction efficiency may be degraded due to an insufficient amount of catalyst. When the catalyst layer is thicker than 30 µm, it may crack and separate from the substrate.

In an embodiment, the catalyst layer includes a typical reforming reaction catalyst. Exemplary catalysts include materials such as platinum (Pt), ruthenium (Ru), copper (Cu), copper/zinc oxide (Cu/ZnO), iron (Fe), nickel (Ni), Cu—ZnO/$Al_2O_3$, and combinations thereof where Cu—ZnO/$Al_2O_3$ is a catalyst including an alumina carrier supported by Cu and ZnO.

The catalyst layer may also include a supporter having a large surface area. Suitable carriers include oxide-based carriers such as $CeO_2$, $Al_2O_3$, $SiO_2$, MgO, CaO, $TiO_2$, and combinations thereof.

According to an embodiment, the catalyst layer is secured to the internal walls of the micro tunnel using an adhesive layer. The adhesive layer may be of the same material as the catalyst supporter of the catalyst layer or it may be of a different material such as alumina or silica.

In an embodiment, the adhesive layer may have a thickness ranging from 0.1 to 1 µm. When the adhesive layer is thinner than 0.1 µm, the catalyst layer is not adhered uniformly. When the adhesive layer is thicker than 1 µm, no further advantages are generally achieved.

In an embodiment, the catalyst layer may be formed in the micro reforming reactor by using a flow coating method. According to such a method, the first and second substrate are joined together to form a micro tunnel, a catalyst coating liquid is allowed to flow through the micro tunnel, and a gas is injected into the micro tunnel. In contrast to other methods for coating a catalyst layer in a micro reforming reactor, which methods include Physical Vapor Deposition, Chemical Vapor Deposition, anodic oxidation, catalyst packing, or dip coating based on a sol-gel method, the flow coating method forms the catalyst layer only on the inside of the micro tunnel.

According to another embodiment of the invention, the micro reforming reactor of the present invention may be prepared by: forming a reactor having a micro tunnel by providing a first substrate with a micro channel having a width of less than 1,000 µm, providing a second substrate over the micro channel of the first substrate to form the micro tunnel; forming an adhesive layer on the internal walls of the micro tunnel; flowing a coating liquid through the micro tunnel; injecting a gas into the micro tunnel; and heat treating the coated micro tunnel.

The micro channel of the first substrate may be formed using a method such as injection molding, milling, turning, drilling, punching, embossing, electro discharge machining, laser micromachining, or methods used in manufacturing semiconductors such as wet etching, dry etching, or lithography-electroforming-molding techniques (also known as LIGA from the German: "LIthographie, Galvanoformung, Abformung").

In an embodiment, the micro channel of the first substrate may have a hydrophilic oxidation layer on its surface that is naturally formed from the material of the first substrate. The inclusion of such an oxidation layer provides excellent adhesive properties to the hydrophilic catalyst coating liquid used for preparing a reforming reactor or an adhesive coating liquid for forming the adhesive layer.

The materials of the first substrate and the second substrate and the dimensions of the micro channel are as described above.

In an embodiment, the first substrate and the second substrate may be bonded by direct contact before the catalyst layer is formed. The micro channel contacts the second substrate to thereby form the micro tunnel of the micro reactor. Examples of direct bonding techniques include anodic bonding, Silicon Fusion Bonding (SFB), anodic bonding, intermediate-layer assisted bonding, and combinations thereof. Among these methods, preferred methods include positive electrode bonding techniques.

According to an embodiment, after the reactor is prepared, the adhesive layer and the catalyst layer are formed on the internal walls of the micro tunnel of the reactor by sequentially applying an adhesive coating liquid and a catalyst coating liquid using flow coating methods. By using flow coating methods, the coating layers are applied only on the internal walls of the micro tunnel. The thickness of the coating layer may be controlled according to the viscosity of the coating liquid and the gas injection rate.

According to an embodiment of the present invention, it is preferred to form an adhesive layer prior to forming a catalyst layer on the inside of the micro tunnel. When the adhesive layer is not applied before the formation of the catalyst layer, the adhesiveness between the catalyst layer and the substrate may be degraded and thus the catalyst layer may separate from the substrate.

According to an embodiment, the adhesive layer is formed by: supplying an adhesive coating liquid to the inside of the micro tunnel of the reactor; injecting a gas to the inside of the micro tunnel; and heat treating the coated surface of the micro tunnel.

In an embodiment, the pH of the adhesive coating liquid may range from 3 to 4, and more particularly, from 3.5 to 3.7. When the pH of the adhesive coating liquid is lower than 3, the sol tends to be too gelled to be used for coating. When it is higher than 4, sol is not formed.

In an embodiment, the viscosity of the adhesive coating liquid may range from 4 cp to 14 cp. When the viscosity of the adhesive coating liquid is lower than 4 cp, the coating layer tends to be too thin and when it is higher than 14 cp, the coating layer may become unnecessarily thick.

In an embodiment, the adhesive coating liquid may be prepared by: mixing one or more compounds selected from the group consisting of aluminum tri-isopropylate, aluminum-sec-butylate, aluminum tributoxide, aluminum-tri-sec-butoxide, and aluminum secondary butoxide with water at a weight ratio of 1:90 to 1:100; hydrolyzing the mixture at 75° C. to 95° C.; adding an acid compound to lower the pH of the mixture to within a range from 3 to 4, and more specifically, from 3.5 to 3.7; and performing peptization for one hour while vigorously agitating the mixture at a temperature between 75° C. and 95° C.

Suitable acid compounds used for the preparation of the sol include hydrochloric acid (HCl), nitric acid ($HNO_3$), acetic acid ($CH_3COOH$), perchloric acid ($HClO_4$), trichloroacetic acid ($CCl_3COOH$), and combinations thereof.

In an embodiment, an aqueous solution of polyvinyl alcohol may be added to prevent the adhesive layer from cracking during the viscosity control, drying, and firing steps. The concentration of the polyvinyl alcohol aqueous solution may range from 0.03 to 0.1 g/mL, and 30 to 50 parts by weight polyvinyl alcohol aqueous solution may be mixed with 70 to 50 parts by weight adhesive coating liquid.

According to an embodiment, the adhesive is thicker than 0.1 μm, and more specifically, is from 0.1 to 0.2 μm. When the adhesive layer is thinner than 0.1 μm, the adhesion is poor.

In an embodiment, the gas injection rate used to achieve the above-described thickness may range from 20 to 80 mL/h, and more specifically, may range from 40 to 60 mL/h. The higher the rate of gas injection, the thicker the adhesive layer grows. The lower the rate of gas injection, the thinner the adhesive layer grows.

The gas used for the gas injection is not limited to any specific gases, but suitable examples include air, nitrogen gas, and inert gases.

According to an embodiment, a reactor coated with the adhesive layer is then heat treated, and a catalyst layer is formed. The temperature for the heat treatment may range from 400 to 600° C., and the heat treatment may be carried out from three to five times.

According to an embodiment, after the adhesive layer has been formed, the catalyst layer is formed by using a flow coating method. The viscosity of the catalyst coating liquid that is used for forming the catalyst layer may range from 10 to 5,500 cp when the shear rate is between 5/s and 6/s, more specifically, it may range from 13 to 5,500 cp. When the viscosity of the catalyst coating liquid is lower than 10 cp, the catalyst layer becomes thin. When it is higher than 5,500 cp, the catalyst layer becomes unnecessarily thick and the catalyst layer may crack and separate from the adhesive layer.

According to an embodiment, the catalyst coating liquid may include a conventional catalyst for a reforming reactor. Examples include platinum (Pt), ruthenium (Ru), copper (Cu), copper/zinc oxide (Cu/ZnO), iron (Fe), nickel (Ni), $Cu—ZnO/Al_2O_3$, and combinations thereof. The shape of the catalyst is not limited to any specific shape, but in one example, the catalyst is provided in the catalyst coating liquid in the form of powder. The catalyst may optionally include one or more oxide carriers. Examples of oxide carriers include $CeO_2$, $Al_2O_3$, $SiO_2$, MgO, CaO, $TiO_2$, and combinations thereof.

According to an embodiment, the catalyst coating liquid may be prepared by mixing the catalyst with water at a weight ratio of 1:2 to 1:10. In another embodiment, the catalyst coating liquid may be prepared by mixing the catalyst with an oxide sol at a weight ratio of 1:2 to 1:10. In still another embodiment, a combination of the two may be used.

Examples of the oxide sol used for preparing the catalyst coating liquid are the same as the examples of the oxide sol used for preparing the adhesive layer. The same material as that of the adhesive layer may be used as it is, or a material obtained by adjusting the ingredients of the material may be used.

In an embodiment, the catalyst coating liquid is prepared by mixing the sol with a catalyst at room temperature.

In an embodiment, the catalyst coating liquid may further include an aqueous solution of polyvinyl alcohol to control the viscosity of the catalyst coating liquid and prevent the catalyst layer from cracking during drying and firing. The concentration of the polyvinyl alcohol aqueous solution may range from 0.03 to 0.1 g/mL, and 30 to 50 parts by weight polyvinyl alcohol aqueous solution may be mixed with 70 to 30 parts by weight catalyst coating liquid.

According to an embodiment, the gas injection rate may range from 20 to 80 mL/h, and more particularly from 40 to 60 mL/h. The higher the gas injection rate, the thicker the catalyst layer grows and the lower the gas injection rate, the thinner the catalyst layer grows.

The gas used herein is not limited to any specific kind of gas, and examples include nitrogen gas or an inert gas.

Subsequently, the micro reforming reactor for a fuel cell is prepared by heat treating the reactor after it has been coated with the catalyst layer. The heat treatment is performed at a temperature that does not cause a sintering phenomenon according to the characteristic of the catalyst used. The heat treatment temperature may range from 250 to 300° C. and the heat treatment may be carried out three to five times.

The following examples illustrate the present invention in more detail. However, it is to be understood that the present invention is not limited by these examples.

EXAMPLE 1

A first substrate with a micro channel 400 μm wide, 240 μm deep, and 50 cm long was prepared by wet-etching the surface of a (110) silicon wafer.

The side of the first substrate upon which the micro channel was formed was bonded to a second substrate of a borosilicate glass produced by the Corning Company, whose product name is Pyrex, by using a positive electrode bonding technique to prepare a reactor having a micro tunnel.

An alumina sol adhesive coating liquid was prepared by mixing aluminum isopropoxide with distilled water at a ratio of 1:100, hydrolyzing the mixture at 90° C., adding 0.07 mol/g hydrochloric acid (HCl), and performing peptization for one hour while vigorously agitating the mixture.

100 parts by weight alumina sol were mixed with 0.03 g/mL polyvinyl alcohol aqueous solution at a weight ratio of 1:1. The alumina sol mixture was agitated for one hour at 92° C. and then cooled down to room temperature. The pH of the alumina sol mixture was 3.5 and the viscosity was 14 cp.

The alumina sol mixture was allowed to flow through the inside of the micro tunnel of the reactor and, 5 minutes later, air was injected at a rate of 40 mL/h to coat the internal walls of the micro tunnel with an adhesive layer. Subsequently, the substrates with the micro tunnel were heat treated three times at 500° C. to form an alumina adhesive layer.

A catalyst coating liquid was prepared in the form of slurry having a viscosity of 32 cp by mixing a powder-type Cu—ZnO/$Al_2O_3$ catalyst with the alumina sol at a weight ratio of 1:10, and ball-milling for five days.

The catalyst layer was allowed to flow through the micro tunnel which had already been coated with an adhesive layer, and air was injected at a rate of 40 mL/h for five minutes. Then, the substrates coated with the catalyst layer were heat treated for three hours at 300° C. to form the catalyst layer for the micro reforming reactor.

EXAMPLE 2

A micro reforming reactor for a fuel cell was prepared according to the same method as Example 1, except that a slurry-type catalyst coating liquid having a viscosity of 174 cp was prepared by mixing the powder-type Cu—ZnO/$Al_2O_3$ catalyst with alumina sol with a pH 3.7 at a weight ratio of 1:10, and ball-milling the catalyst-alumina sol mixture for five days.

EXAMPLE 3

A micro reforming reactor for a fuel cell was prepared according to the same method as Example 1, except that a slurry-type catalyst coating liquid having a viscosity of 13 cp was prepared by mixing the powder-type Cu—ZnO/$Al_2O_3$ catalyst with water at a weight ratio of 1:10, and ball-milling the catalyst mixture for five days.

EXAMPLE 4

A micro reforming reactor for a fuel cell was prepared according to the same method as Example 1, except that a slurry-type catalyst coating liquid having a viscosity of 102 cp was prepared by mixing the powder-type Cu—ZnO/$Al_2O_3$ catalyst with water at a weight ratio of 1:5, and ball-milling the catalyst mixture for five days.

EXAMPLE 5

A micro reforming reactor for a fuel cell was prepared according to the same method as Example 1, except that a slurry-type catalyst coating liquid having a viscosity of 5,500 cp was prepared by mixing the powder-type Cu—ZnO/$Al_2O_3$ catalyst with water at a weight ratio of 1:2, and ball-milling the catalyst mixture for five days.

Cross-sections of the micro reforming reactors having the catalyst layer prepared in accordance with Examples 1 to 5 were observed.

Figure 2:
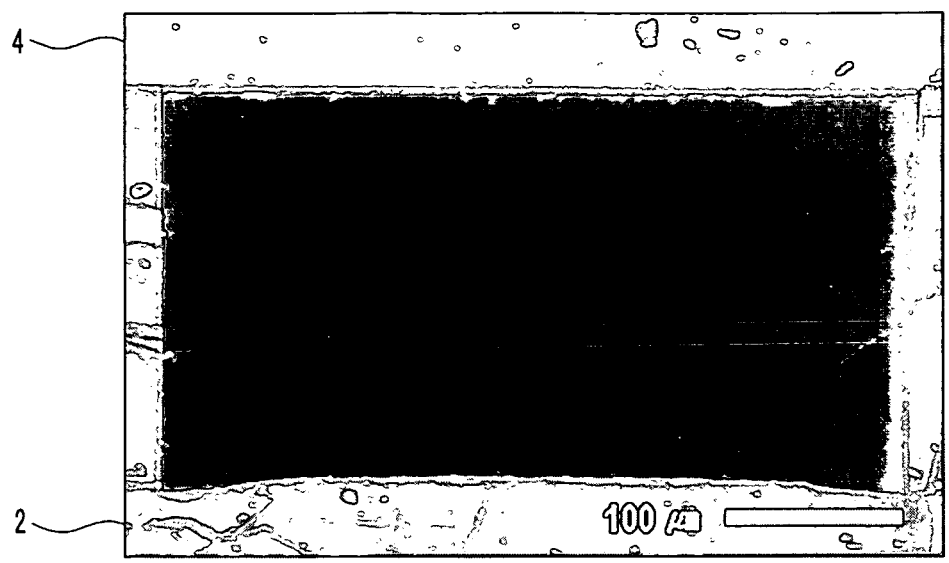
FIG. 2 is a Field Emission Scanning Electron Microscope (FESEM) photograph showing a cross-section of a micro tunnel formed by bonding a first substrate with a second substrate.
Figure 3A:
FIGS. 3A to 3D are FESEM photographs showing cross-sections of a micro reforming reactor for a fuel cell coated with an adhesive layer in accordance with Example 1 of the present invention.
Figure 3B:
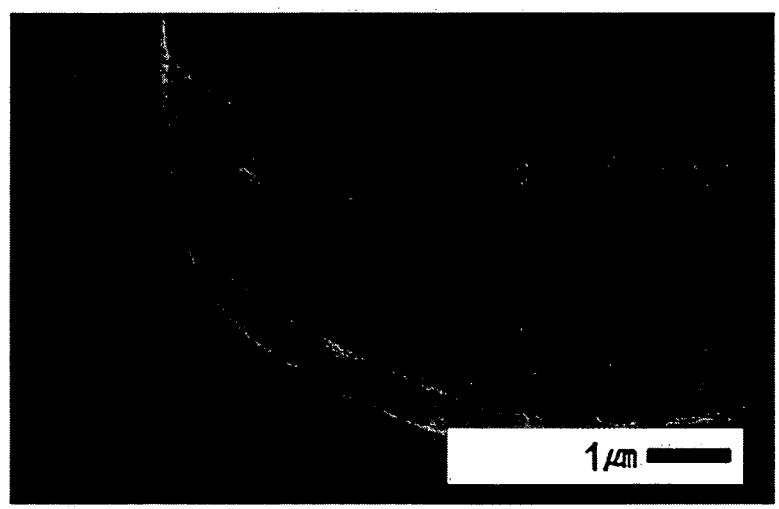
Figure 3C:
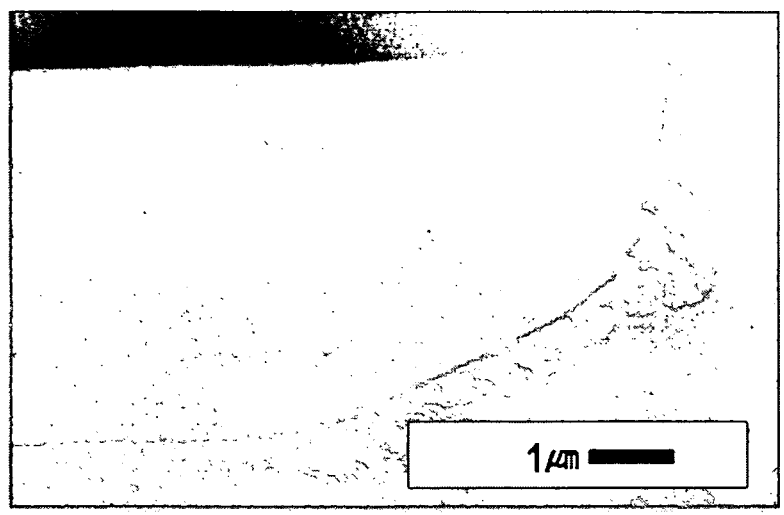
Figure 3D:
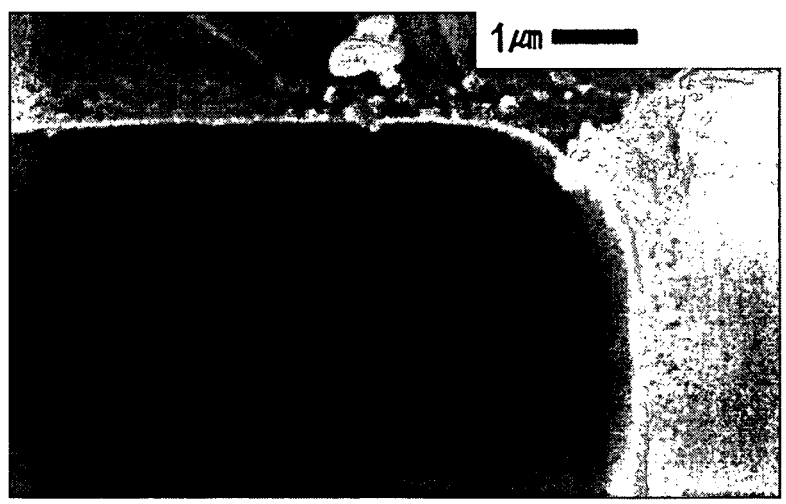
Figure 4A:
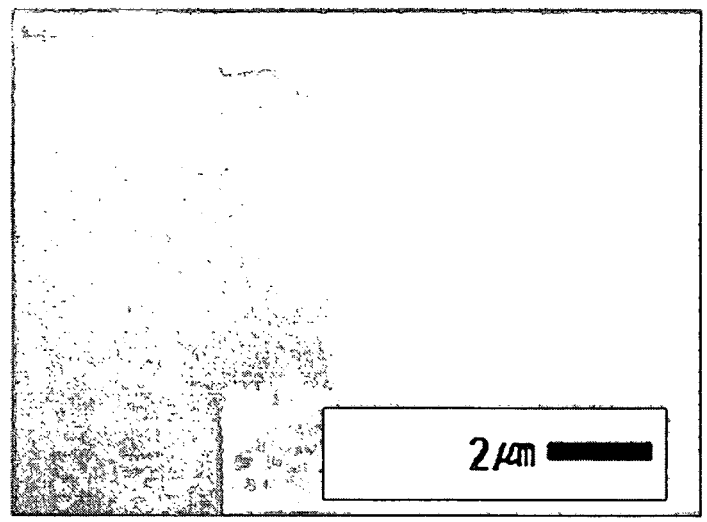
FIGS. 4A to 4H are FESEM photographs showing cross-sections of a micro reforming reactor for a fuel cell coated with a catalyst layer on top of the adhesive layer in accordance with Example 1 of the present invention.
Figure 4B:
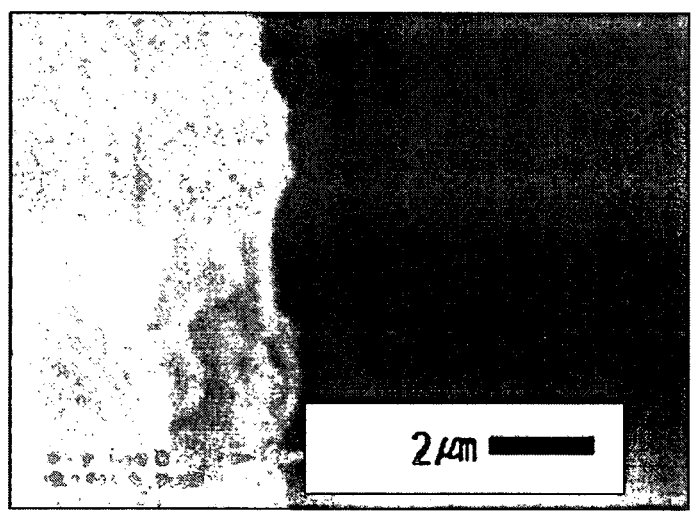
Figure 4C:
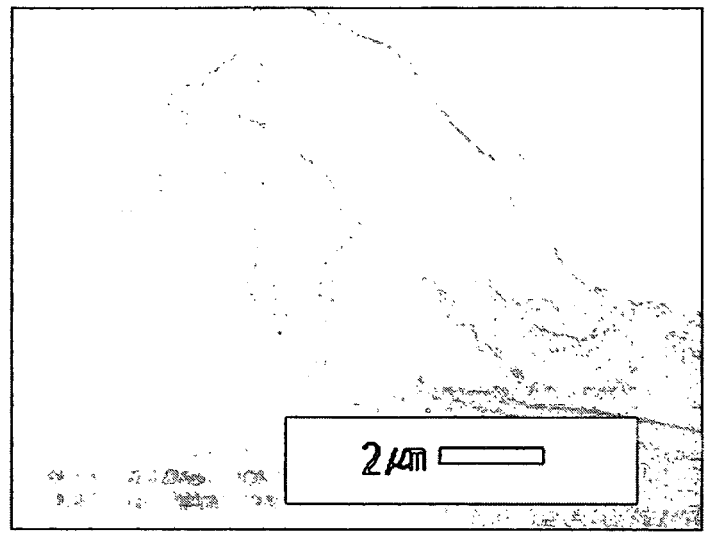
Figure 4D:
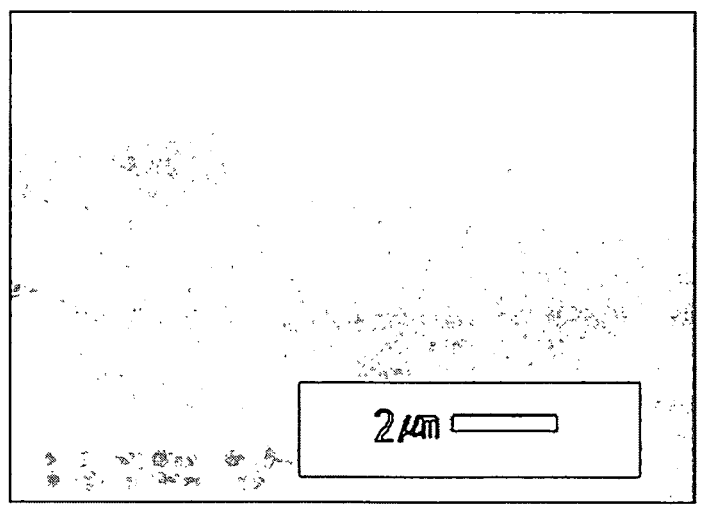
Figure 4E:
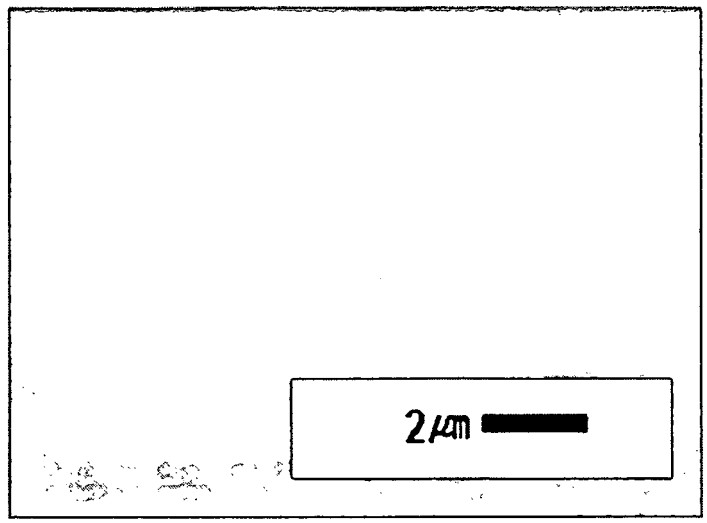
Figure 4F:
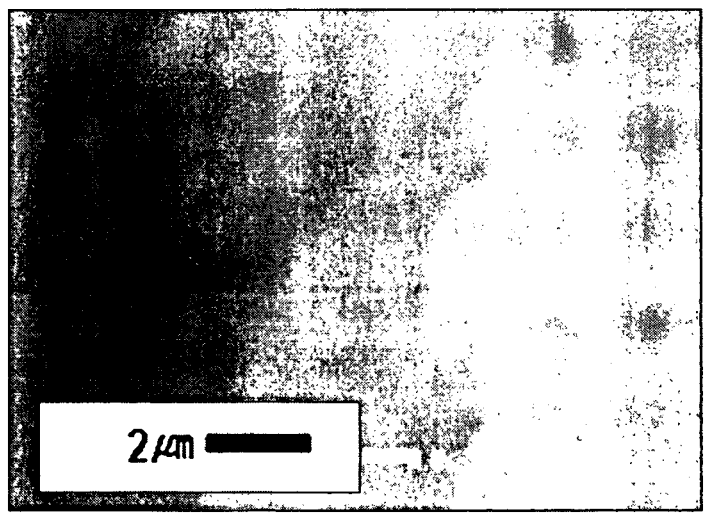
Figure 4G:
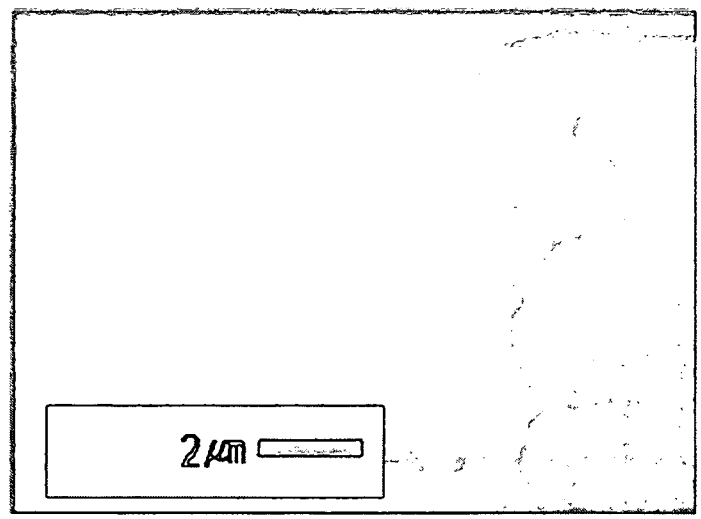
Figure 4H:
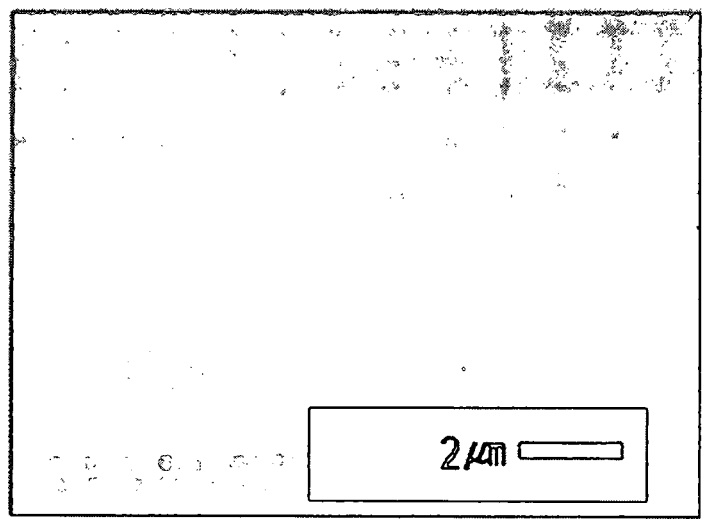

FIG. 2 is a Field Emission Scanning Electron Microscope (FESEM) photograph showing a cross-section of a micro tunnel of the micro reforming reactor formed by contacting a first (lower) substrate with a second (upper) substrate in accordance with Example 1.

FIGS. 3A to 3D are FESEM photographs showing cross-sections of a micro reforming reactor for a fuel cell coated with an adhesive layer in accordance with Example 1.

FIGS. 4A to 4H are FESEM photographs showing cross-sections of a micro reforming reactor for a fuel cell coated with a catalyst layer over an adhesive layer in accordance with Example 1.

It can be seen from FIGS. 4A to 4H that the micro reforming reactor with the adhesive layer and the catalyst layer formed in the flow coating method includes the catalyst layer only in the internal walls of the micro tunnel and the first substrate and the second substrates were bonded with excellent adhesion.

According to certain embodiments of the present invention, the catalyst layer may be formed only in the fine micro channel. Since the catalyst layer exists only on the internal walls of the micro channel, the adhesive state of the first and second substrates is excellent.

While this invention has been described in connection with what are presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A micro reforming reactor for a fuel cell, comprising:
   a first substrate having a first side defining a micro channel with a width of 1,000 µm or less;
   a second substrate contacting the first side of the first substrate and enclosing the micro channel, thereby forming a micro tunnel through which fluid may flow, the micro tunnel defined by at least one internal wall;
   an adhesive layer formed on each internal wall of the micro tunnel; and
   a catalyst layer formed over the adhesive layer, wherein the adhesive layer is from 0.1 to 1 µm thick.

2. The micro reforming reactor of claim 1, wherein the width of the micro channel is from 1 to 1,000 µm.

3. The micro reforming reactor of claim 1, wherein the micro channel has a depth from 1 to 1,000 µm.

4. The micro reforming reactor of claim 1, wherein each of the first substrate and the second substrate is formed of a material independently selected from the group consisting of silicon wafer, borosilicate glass, stainless steel, aluminum, glass, polymers, and combinations thereof.

5. The micro reforming reactor of claim 1, wherein the micro channel of the first substrate includes an oxide layer.

6. The micro reforming reactor of claim 1, wherein the catalyst layer is from 1 to 30 µm thick.

7. The micro reforming reactor of claim 1, wherein the catalyst layer comprises at least one catalyst selected from the group consisting of platinum (Pt), ruthenium (Ru), copper (Cu), copper/zinc oxide (Cu/ZnO), iron (Fe), nickel (Ni), Cu—ZnO/$Al_2O_3$, and combinations thereof.

8. The micro reforming reactor of claim 1, wherein the catalyst layer comprises at least one oxide carrier selected from the group consisting of $CeO_2$, $Al_2O_3$, $SiO_2$, MgO, CaO, $TiO_2$, and combinations thereof.

9. The micro reforming reactor of claim 1, wherein the adhesive layer comprises a material selected from the group consisting of alumina, silica, and combinations thereof.

10. The micro reforming reactor of claim 1, wherein the catalyst layer is formed by a flow coating method.

11. The micro reforming reactor of claim 1, wherein the second substrate contacts the first side of the first substrate at portions of the first side not defining the micro channel.

12. A micro reforming reactor for a fuel cell, comprising:
a first substrate having a micro channel with a width of 1,000 μm or less;
a second substrate contacting portions of the first substrate not defining the micro channel, thereby enclosing the micro channel and forming a micro tunnel through which fluid may flow, the micro tunnel defined by at least one internal wall;
an adhesive layer formed on each internal wall of the micro tunnel; and
a catalyst layer formed over the adhesive layer, wherein the adhesive layer is from 0.1 to 1 μm thick.

* * * * *

UNITED STATES PATENT AND TRADEMARK OFFICE
CERTIFICATE OF CORRECTION

PATENT NO. : 8,486,163 B2
APPLICATION NO. : 11/584993
DATED : July 16, 2013
INVENTOR(S) : Ju-Yong Kim et al.

It is certified that error appears in the above-identified patent and that said Letters Patent is hereby corrected as shown below:

On the Title Page

Item (73) Assignees       Delete "Yonging-si"
                          Insert -- Yongin-si --

In the Claims

Column 8, Claim 7, line 58       Delete "Cu--ZnO/Al2O3,"
                                 Insert -- Cu-ZnO/Al2O3, --

Signed and Sealed this
Twenty-third Day of December, 2014

Michelle K. Lee
*Deputy Director of the United States Patent and Trademark Office*